US009264880B2

(12) United States Patent
Walsh et al.

(10) Patent No.: US 9,264,880 B2
(45) Date of Patent: Feb. 16, 2016

(54) PAYMENT AUTHENTICATION SYSTEMS

(71) Applicants: Damien Walsh, Cambridge (GB); Andrew Bovingdon, Bury St. Edmunds (GB); Anil Malhotra, Cambridge (GB); Raymond Anderson, Cambridge (GB)

(72) Inventors: Damien Walsh, Cambridge (GB); Andrew Bovingdon, Bury St. Edmunds (GB); Anil Malhotra, Cambridge (GB); Raymond Anderson, Cambridge (GB)

(73) Assignee: BANGO.NET LIMITED (GB)

( * ) Notice: Subject to any disclaimer, the term of this patent is extended or adjusted under 35 U.S.C. 154(b) by 317 days.

(21) Appl. No.: 13/863,878

(22) Filed: Apr. 16, 2013

(65) Prior Publication Data

US 2013/0273882 A1 Oct. 17, 2013

Related U.S. Application Data

(60) Provisional application No. 61/637,511, filed on Apr. 24, 2012.

(30) Foreign Application Priority Data

Apr. 17, 2012 (GB) .................................. 1206733.6

(51) Int. Cl.
 *H04W 4/26* (2009.01)
 *G06Q 20/40* (2012.01)
 *G06Q 20/32* (2012.01)
 *G06Q 20/10* (2012.01)
 *H04M 15/00* (2006.01)
 *H04W 4/24* (2009.01)

(52) U.S. Cl.
 CPC .............. *H04W 4/26* (2013.01); *G06Q 20/102* (2013.01); *G06Q 20/3223* (2013.01); *G06Q 20/3255* (2013.01); *G06Q 20/40* (2013.01); *H04M 15/68* (2013.01); *H04M 2215/28* (2013.01); *H04M 2215/32* (2013.01); *H04W 4/24* (2013.01)

(58) Field of Classification Search
 CPC ..................... H04M 2215/28; H04M 2215/32; H04M 15/68; H04M 4/24
 USPC .................................................. 455/406, 408
 See application file for complete search history.

(56) References Cited

U.S. PATENT DOCUMENTS

| | | | | |
|---|---|---|---|---|
| 2010/0100945 | A1* | 4/2010 | Ozzie et al. | 726/5 |
| 2010/0287228 | A1* | 11/2010 | Hauser | 709/203 |
| 2012/0276870 | A1* | 11/2012 | Davis et al. | 455/407 |
| 2012/0291108 | A1* | 11/2012 | Talamo et al. | 726/6 |

FOREIGN PATENT DOCUMENTS

| | | |
|---|---|---|
| GB | 2388234 A | 11/2003 |
| GB | 2398159 A | 8/2004 |
| GB | 2428855 A | 2/2007 |
| WO | WO2007/071946 A1 | 6/2007 |
| WO | WO2010/085371 A2 | 7/2010 |

* cited by examiner

*Primary Examiner* — Barry Taylor
(74) *Attorney, Agent, or Firm* — Tarolli, Sundheim, Covell & Tummino LLP

(57) ABSTRACT

An authentication server and a method of enabling a user of a communications capable device to make a payment via a mobile operator billing system are described. The authentication server determines a user identifier string for sending to a communications capable device according to a probability of successful entry by a user. The user identifier string is linked to the content item data and the string sent to the communications capable device. The user responds, via a mobile network, by sending a short message service (SMS) based user response. The response is compared to previously transmitted user identifier messages, and billable user identity data appended to the SMS by the mobile network can be used to associate the transaction in process with billable identity data derived from the carrier data to enable a user's mobile phone account to be billed for the purchase.

38 Claims, 6 Drawing Sheets

PAYMENT AUTHENTICATION SYSTEMS

RELATED APPLICATIONS

This application is claims priority from U.S. Provisional Patent Application Ser. No. 61/61/637,511, filed 24 Apr. 2012 and United Kingdom Patent Application No. 1206733.6, filed 17 Apr. 2012, both of which are incorporated herein by reference in their entirety.

FIELD OF THE INVENTION

The present invention relates to systems and methods for identifying and authenticating users in on-line transactions to enable a user of a device, such as a smart-phone, to pay for an item of content.

BACKGROUND TO THE INVENTION

A wide range of content is available for download to communications/internet enabled devices such as mobile phones, smartphones, tablets, connected TVs, laptop and desktop computers. With the explosion in recent years of smartphones and tablets, there is also a move further towards using portable devices for more and more on-line transactions that were, until only a few years ago, reserved for desktop and laptop computers in the home or office.

The range of transactions now performed on portable devices ranges from small transactions such as the purchase of a ring-tone, acquiring credits for use on on-line portals, booking cinema and theatre tickets, through to grocery shopping and holidays. Many of these transactions are enabled through the use of on-line payments and billing platforms, which optimize and present the "on screen" user experience when a person makes a purchase on a mobile internet capable device.

For many of these transactions, more often those at the lower end of the price range, one method of payment is through a mobile network operator (MNO). A payment server may communicate with a MNO billing platform to identify and bill a user by charging the transaction to their mobile network account. Billing to a mobile network account is preferable for many users and transactions as it simplifies the transaction process, meaning no new credit card details need to be entered for each transaction, avoiding the transmission of personal data, and making the process quick and easy. It also means users without a credit card are still able to purchase items via their mobile phone/data account.

Performing this process requires identification of the user's mobile network account which is linked to a SIM, in the mobile device. This means that MNO-based billing is only possible when the transaction is performed over a mobile network, so that this identifier information can be obtained and tied to the transaction.

Data usage on cellular networks is becoming increasingly problematic for mobile network operators as media rich content including streaming and downloading is delivered to mobile devices. Where, previously, MNOs were keen to restrict mobile devices to using their own mobile networks only, effectively to 'lock in' users, the use of smart phones and tablets with other forms of connectivity has led to users making use of alternative communications infrastructure such as WiFi—something mobile operators are willing to accept to alleviate demands placed on the mobile network infrastructure. Moreover, even users themselves, provided with devices having media-rich capabilities, continue to use such devices in the home or office where WiFi connections are available providing increased bandwidth, data rates and to avoid using any allowance imposed on mobile (cellular) data access. Furthermore, when a user is abroad, data roaming costs can be prohibitively expensive for many users, meaning that users prefer to use other connections where possible for downloading content.

However, a downside of moving to the use of other networks, such as WiFi networks (or more generally wireless local area networks) that are not part of a mobile/cellular network is that a user is no longer able to bill a purchase to their mobile network account as the unique identifiers provided by the SIM (communicated as part of a transaction over the mobile network) are no longer available to a billing platform. There is therefore a need to provide systems and methods to retain such billing capabilities.

SUMMARY OF THE INVENTION

According to a first aspect of the invention there is provided a method of enabling a user of a communications capable device to make a payment via a mobile operator billing system, the method comprising: determining a user identifier string for sending to a communications capable device; said determining comprising: selecting a user identifier string from a message data store according to a probability of success of entry by a user; linking said user identifier string to content item data, said content item data identifying an item of content pertaining to said payment; sending said user identifier string to said communications capable device; receiving, via a mobile network, a short message service (SMS) based user response, said user response comprising a message response and billable user identity, wherein said billable user identity is appended to said user response by said mobile network; comparing said message response with a said user identifier string to determine if said message response matches said user identifier string; responsive to said message response matching said user identifier string, identifying content item data associated with said user identifier string and associating said billable user identity received from said mobile network with said content item data; and communicating said billable user identity to a billing system to approve said request for said item of content.

Herein where we refer to an item of content, this includes any form of item that could be purchased electronically, including physical items that could be delivered separately, electronic media such as ringtones, music, videos and the like and also other forms of purchasing such as credit purchasing (vouchers, points etc).

This provides a process for the user to purchase an item of content without needing any form of pre-registration with the content provider or billing provider. The user may purchase an item of content, such as a media item, via a web-site using their communications capable device. The mobile communications capable device is connected to the content provider via a WiFi connection for example. During the purchasing process, in some cases, the user may have the option of purchasing the content via credit card, debit card, on-line payment account, or mobile phone account. The first three options require a user to enter card details (which may be a security risk) or require preregistration. Opting for the last option of billing to a mobile phone account requires the payment authentication system to obtain details of the mobile user's phone account. One option—pre-registration—may be cumbersome, and may deter a user from purchasing as they may have to enter personal details (which may not be desirable) then return to the purchasing process. On some devices this may result in going through the purchasing process again as the original process was previously left mid transaction.

If a user opts to charge the purchase to a mobile phone account, the authentication server identifies the billable user identity information, which provides operator ID and user specific information (e.g. phone number/MSISDN) associated with a user's mobile phone account, is not available for the payment process. The content item data, which may have been received from a content provider, provides data relating to the transaction, such as transaction identification data (providing a unique transaction ID assigned to the content item being purchased for example), and may include details of the item being purchased, cost information, and a transaction identifier for example.

This means that such information needs to be obtained by the server by generating a user identifier string and sending this to the communications capable device.

The server selects a user identifier string (UIM) to send out basis on a probability of success of entry by the user. This is provided by retrieving and filtering a selection of strings (message strings) stored in a message data store. The UIM may be a short word for example, that is easily memorable by a user allowing them to enter the string (text string), or copy the text into a text messaging/SMS application on their phone. Such an application may be opened automatically if the mobile device so permits. Words are selected according to a probability of success of entry by a user.

Such a probability of success of entry by a user may be dependent on a characteristic of the communications capable device. Thus, the message generation may be targeted to a specific device such that the processing of determining a user identifier string further comprises identifying a characteristic of the communications capable device (communicating with an authentication server). Some words may be hard to enter on the particular device used and this may lead to repeated failures, words may be hard to remember and may inevitably lead to a user abandoning the transaction. The selection may be based on one or more parameters obtained from the communications capable device, including different forms of device type data (such as the model of the mobile device). The parameters may include, for example:

The operating language of the communications capable device. If the device is configured to use an English dictionary for example, a memorable English word may be selected by the server.

Details relating to the operating system of the communications capable device. Such data may relate to the range of languages available, available dictionaries, autocomplete functions, and provide information allowing the server to ascertain which words may be easily entered based on the supported capabilities of the particular operating system. For example, a Blackberry™ operating system may suggest the presence of a physical alphanumeric keyboard; an iOS device may suggest features are limited to touchscreen input methods only.

More specific device information, such as a keyboard arrangement of the communications capable device may also be used since some words are simpler to enter than others depending on the particular keyboard layout ("QWERTY" vs "AZERTY" keyboards for example).

Methods of text entry. Some devices may use a numeric keypad with a form of text prediction such as "T9" text prediction, while others may use a full keyboard with various forms of text entry and autocompletion of words. Furthermore, some devices, such as Android based devices, may allow custom keyboards to be used providing different forms of text entry, such as those provided by Swype™ or Swiftkey™ as examples. In such a situation, the ease of entering words may be dependent on the autocompletion algorithms and dictionary used by the device/operating system. Thus, to ensure a user is presented with a message that is simple to remember and enter, words may be selected that only require the first few letters to be entered on the mobile device and lead to the word being displayed as a list of autocomplete options.

Location of the device. Location data, derived from the IP address of the device, if a fixed IP, or of a gateway connecting the device to the internet, may be factored into the word selection and may be further used in any subsequent fraud monitoring. When a text message is received from the device, location data may be compared to carrier specific information to see if the two tie up or is suggestive of a fraud attempt. GPS location data may also be used if the device permits.

The selected string is then sent (which includes presenting on a webpage rendered to the user) to the mobile device as, for example, a webpage as part of the content purchasing process/check-out process, via the current active connection, which may be a WiFi connection for example (as a user's mobile contact details, such as mobile phone number, are not available to the authentication system meaning that communication at this point must be via a non-cellular connection). The selected message is linked to the transaction/content item data so the server can identify the particular transaction to which the selected message is associated.

The user is presented with the user identifier string and a messaging number (such as an SMS short code) to send the response to. The user identifier string may be rendered as a webpage (for web purchasing) on the user's communications capable device, or may alternatively be rendered within an application that the user is running (in-app purchasing). In variants, applications may have the ability to silently send a message for authentication Where an app (or webpage) can automatically construct and send the SMS message a strong user identification string may be used—this may be long as it would not require memory or typing.

Depending on the specific device, when rendered as a webpage, the webpage presented to the user may be able to automatically open up a user's text messaging application, or the user may need to open it manually. The user enters the message received, which should be relatively straightforward in view of the selection of word(s) and sends the text message to the SMS shortcode. In another variant the message may be prefilled with the text string, requiring the user to only click send. The webpage may also be able to construct and send the complete message incorporating the string. Where this is the case it may do so. This may be totally automatic and silent, or he user may be required to approve sending but both cases would not be required to remember and type the user identification string, instead a long/strong identification string would be automatically used.

Sent via the mobile/cellular network, the response is appended with carrier fields, including identity data relating to the source of the text message, meaning that a billable user identity (operator identity, user's phone number/MSISDN) is provided back to the authentication server when the text message is received. The authentication server then compares the received message with previously presented strings (which may have been rendered as a web page for example) to match up the sent and received messages if the correct response is received.

On finding a match, the billable user identity information can then be tied to the transaction/content item data via the carrier identity, which is tied to the particular user via, for example, the operator ID and MSISDN. Billing servers of the mobile network carrier on which the user has an account can then be contacted to authorise payment (verifying the user has sufficient credit and that there are no bars on purchasing for example). On confirmation of a user's billable identity the system can then display a standard mobile payment page where the user can confirm a payment.

Responsive to said operator billing system approving the request for the item of content the method may further comprise approving payment for the item of content, which may typically be via a payment system.

The selecting process may comprise retrieving a plurality of user identifier strings from the message data store and filtering the plurality of strings to select the user identifier string from one of the plurality of filtered strings according to the probability of success of entry by a user. In other words, selecting may be a stepwise process first comprising filtering the strings to generate a subset, with the filtering applying different criteria including those of the communications capable device characteristics, and then selecting from this subset, which, following the filtering may then be random.

The user identifier string sent to a user's mobile device may preferably be stored in a pending message store configured to store a history of user identifier strings transmitted by an authentication server. Content item data linking the transaction to the user identifier string sent may also preferably be stored. The pending message store may store sent messages awaiting a response via text message from a user in order to obtain carrier identity information. The pending message store may then be used as a source of strings to compare a received message response with user identifier strings stored within the pending message store to determine if the message response matches one of the user identifier strings in the store. In other words, to check that the user has responded with the expected string (typically the message response expected would contain the same user identifier string meaning a match is confirmed). Further information, such as a tracking ID associated with the particular transaction may also be stored.

The tracking ID may be a server entity that links to a number of physical identities, such as the above cookie on the device, or a UDID/EMEI or a third party ID/login (e.g. Facebook™ account). Such tracking IDs are used to track a transaction.

Filtering of the plurality of strings to select a user identifier string may further comprise filtering user identifier strings to distinguish the selected user identifier string over user identifier strings in the pending message store. Repeated use of a transmitted string should occur only once a response has been received to that to ensure that no two identical responses are pending at any given time. Furthermore, distinguishing may be more than ensuring no two strings awaiting a response are the same, in particular to minimise the chances of a user entering the wrong string, either through confusion, mistyping, or incorrect auto-completion.

Accordingly, distinguishing may further comprise identifying user identifier strings that autocomplete to a user identifier string different to the record of user identifier strings in the pending message store.

In other words, to avoid an incorrect association between a transaction and billable user ID by two different pending responses accidentally being entered, the filtering process may be aware of autocomplete algorithms used such that no two words (strings) are selected at anyone time that may, following for example one or more key presses, present one user with the same autocomplete option as another pending response.

By way of example, a string present in the pending message store, awaiting a response, may be "ball". When filtering the words for a particular user, and aware of the fact that the user's mobile device may comprise an autocomplete dictionary, the filtering process would also opt to distinguish a subsequent word for use in a string by not choosing other words starting with 'b' and 'a', such as "bail" or "bale". This means that "bail" or "bale" could not be selected until a response to the sending of "ball" has been received or alternatively timed out. Thus, this further minimises the risk of overlap of responses making the system more robust and less prone to errors and incorrect billing. Therefore, in some embodiments, the filtering logic may opt to choose strings to generate that have the first two characters different to strings awaiting a response.

The message data store may comprise a dictionary of words meaning that the user identifier strings sent to a user comprise one or more words selected from a dictionary. This store or dictionary may contain one or more languages, or may be multiple languages allowing language specific words/messages to be sent to increase the chance of successful entry by a user. In addition to words, the dictionary may also include phrases, preferably memorable phrases in order to increase the range of messages available.

Tags may be appended to strings stored in the message data store to allow tracking of when the string has been used/sent and if a response has been received.

An automatic optimisation process may be used to improve the selection of strings sent to a user during the payment process based on previous successful responses. This may comprise, for example using the message data store to further store a message string priority associated with each of the plurality of strings, the message string priority defining a history of success of entry of the associated string. This allows words that may have been problematic to enter to be filtered out over time, ensuring that those with the greater chance of successful entry are prioritised (which may be in combination with the distinguishing over other words previously described). It may be, for example, that many users accidentally select the wrong autocomplete word, meaning that the intended word is not received by the server. By tracking success, the system can optimise and prioritise words/strings sent to a user. In other words, selecting a user identifier string according to a probability of success of entry by a user may be dependent on previously successful entry of user identifier strings.

In some embodiments, the prioritisation may be implemented by increasing the value stored in a message string priority field associated with a string in the message data store. Additionally or alternatively, any failed responses (that do not arrive within a timeout period), for example may lead to the message string priority field value being decreased. One method of providing the priority value adjustment may be to reduce the value by one ("−1") when a user identifier string is transmitted, and then, if a message response is received, to increase the priority value by two ("+2") which then obviates the requirement to subsequently reduce a priority value for messages in the pending data store should they timeout before a response is received.

User identifier strings may also timeout, meaning that the matching process may require a response to be received within a predetermined period (By way of example only, this predetermined period may vary on a regional or content provider basis). In other words, if a message response is matched to a user identifier string outside of a predetermined period, then it will be deemed to be unaccepted. The pending message store may optionally store strings for longer than the predetermined period so that delayed response can be identified (but not accepted), which may be useful for analytic purposes, or alternatively, may remove records of strings transmitted (presented/displayed to a user on the communications capable device) once such a period has expired for that particular message.

In addition to filtering, selecting and sending user identifier strings, the method may further comprise selecting a contact number from a list of contact numbers and sending the selected contact number with the user identifier string to the communications capable device. In other words, there may be a range of telephone numbers, such as SMS short-codes, that may be assigned to the authentication/payment system which may be available to receive SMS responses.

The choice of number/short-code (contact number) may be based on a detected geographical location of the user for example. It will be appreciated however that it may only be possible to base this on an IP address of a WiFi network that a user's device is connected to (as up until now, no communication has been taking place via a cellular network during this transaction). A user may also have the option to tell the authentication system that their operator is not in the automatically detected country. It will be appreciated however that other ways of choosing the number will be available and may also be used to improve security.

In embodiments that may provide numbers/short-codes for responding, the comparison of user identifier strings to receive response may further comprise comparing the selected contact number with the received contact number to determine if the selected contact number matches the received contact number. This may provide increased security in addition to the confirmation of correct response.

The process of receiving, via a mobile network, a short message service (SMS) based user response may further comprise receiving gateway data comprising information pertaining an SMS gateway used to communicate the user response. Such gateway data may be appended to a user response as the SMS is processed/routed by the SMS gateway. Such information may be useful for fraud detection, allowing authentication of the gateway and detection of any gateway spoofing for example.

In the above aspect, the user response may be received from a different communications capable device. In particular this may be useful for situations whereby a user may perform content purchase from a device such as an internet enabled TV, PC or tablet (without an inbuilt cellular radio). In such a situation, the user may see the user identifier string on the non-communications capable device (eg PC, TV etc). They may then send the text message on their cellular communications device (phone) that they wish to make payments on. In future clicking to pay on the non cellular communications capable device (PC, TV etc) may cause the payment transaction to be performed against the phone number and operator of their separate cellular communications capable device (phone).

According to a second aspect of the invention there is provided an authentication server for enabling a user of a communications capable device to make a payment via a mobile operator billing system, the authentication server comprising a processor and memory storing: code to determine a user identifier string for sending to a communications capable device, said code to determine comprising code to select a user identifier string according to a probability of success of entry by a user; code to link said user identifier string to content item data, said content item data identifying an item of content pertaining to said payment; code to send said user identifier string to said communications capable device; code to receive, via a mobile network, a short message service (SMS) based user response, said user response comprising a message response and billable user identity, wherein said billable user identity is appended to said user response by said mobile network; code to compare said message response with a said user identifier string to determine if said message response matches said user identifier string; code to responsive to a match to identify content item data associated with said user identifier string and associate said billable user identity received from said mobile network with said content item data; and code to communicate said billable user identity to a billing system to approve said request for said item of content.

The authentication server may provide one or more of the means via a processing system configured to implement such means.

The authentication server may also implement one or more of the optional features as described with reference to the first aspect of the invention.

The authentication server may comprise, for example, memory storing code to implement one or more of the features of the first aspect of the invention. For example in the authentication server the code to determine a user identifier string may further comprise code to identify a characteristic of said communications capable device communicating with an authentication server, and said code to select a user identifier string may further comprise code to retrieve a plurality of user identifier strings from the message data store and code to filter the plurality of strings to select the user identifier string from one of the plurality of filtered strings according to the probability of success of entry by a user. The probability of success of entry by a user may further be dependent on the characteristic of the communications capable device.

According to a third aspect of the invention there is provided an authentication server for enabling a user of a mobile communications capable device to make a payment via a mobile operator billing system, the authentication server configured to implement the method according to the first aspect of the invention. Such a payment may typically be for an item of content.

According to a fourth aspect of the invention there is provided a method of identifying a user of a communications capable device to an authentication server for paying for an item of content from a content provider using a mobile operator billing system: receiving, at a authentication server, content item data pertaining to a requested item of content from a content supplier; determining a user identifier string for sending to a communications capable device; said determining comprising: selecting a user identifier string from a message data store according to a probability of success of entry by a user; linking said user identifier string to said content item data; sending said user identifier string to said communications capable device; responding to said user identifier string, wherein said responding comprises sending, via a mobile network, a short message service (SMS) based user response to said authentication server, said user response comprising a message response and billable user identity, wherein said billable user identity is appended to said user response by said mobile network; receiving, via said mobile network, said SMS based user response at said authentication server; comparing said message response with a said user identifier string to determine if said message response matches said user identifier string; responsive to said message response matching said user identifier string, identifying content item data associated with said user identifier string and associating said billable user identity received from said mobile network with said content item data; and communicating said billable user identity to a billing system to approve said request for said item of content.

The determining a user identifier string may further comprise identifying a characteristic of the communications capable device, and the probability of success of entry by a user may be dependent on the characteristic of the communications capable device such that the selection of identifier string is optimised for particular features, such as an autocomplete dictionary/predictive text algorithm of the particular user device.

According to a fifth aspect of the invention there is provided a method of identifying a user of a communications capable device to enable the user to make a payment for an item of content from a content provider using a mobile operator billing system, the method comprising: receiving a user identifier string sent from an authentication server used by said content provider without using a mobile phone network; responding to said user identifier string by sending, via a said mobile network, a short message service (SMS) based user response to said user identifier string from said communications capable device to said authentication server to authenticate said user.

In other words, a user may be browsing a content store over a non-cellular network whereby mobile account identification data cannot be ascertained from the communication packets transmitted. This may be, for example, a wireless local area network such as a WiFi network. With a request to purchase an item of content from the content provider, and request to pay via their mobile phone bill/account, an authentication server sends a user identifier string to the communications capable device. As no mobile/cellphone number is available (as the open connection is not via a mobile phone network), the only option is to communicate via the present connection, (WIFI for example).

A user's communications capable device may automatically process the received user identifier string and automatically respond, transmitting a copy of the same message for example, by directly accessing an SMS application on the communications capable device so that the identification/authentication happens 'behind the scenes' without user interaction. This is particularly useful for 'in-application' purchases where a user may have provided, on installation of the application for example, permissions for an application to access an SMS application on the phone and send messages. In such a variation, the user identifier string may be a unique, computer-generated alphanumeric code, for example "RSETY£$%SDSA£%" as the message content does not require manual user entry and so does not need to be memorable.

In variants however, such as those in which a user is presented with a web page via an internet browser on the communications capable device, in order to respond, a user may need to open up an SMS application and enter the data manually (in other variants the response may be prefilled and the user just needs to press send). In such a situation, it is preferable that the user identifier string received is a memorable word, to increase the change of successful entry by a user as described with reference to the first aspect of the invention.

According to a further aspect of the invention there is provided a communications capable device configured to implement the fifth aspect of the invention.

According to a still further aspect of the invention there is provided method of enabling a user of a mobile device to make a payment via a mobile operator billing system, the method comprising: determining a user identifier string for sending to a communications capable device; linking said user identifier string to content item data, said content item data identifying an item of content pertaining to said payment; sending said user identifier string to said communications capable device; receiving, via a mobile network, a short message service (SMS) based user response, said user response comprising a message response and billable user identity, wherein said billable user identity is appended to said user response by said mobile network; comparing said message response with a said user identifier string to determine if said message response matches said user identifier string; responsive to said message response matching said user identifier string, identifying content item data associated with said user identifier string and associating said billable user identity received from said mobile network with said content item data; and communicating said billable user identity to a billing system to approve said request for said item of content In this aspect of the invention, determining a user identifier string may comprise retrieving a text string, such as an "appcode" from the message data store. In other words, for in application purchases whereby an application may automatically invoke an SMS application and populate the response field, or even generate a text message and respond automatically, the user identifier string does not need to be easily memorable or easy to enter by a user.

In variants however, determining a user identifier string comprises selecting a user identifier string from a message data store according to a probability of success of entry by a user. In other words, more successfully entered words may be more regularly used such that the changes of successful entry are improved. This may also further comprise, identifying a characteristic of the communications capable device, and the probability of success of entry by a user may be dependent on the characteristic of the communications capable device being used by a user.

An authentication server may also be configured to implement this particular aspect of the invention, enabling a user of a communications capable device to pay for an item of content via a mobile operator billing system.

According to a further aspect of the invention there is provided a method of enabling a user of a mobile device to make a payment via a mobile operator billing system of a mobile network operator, the method comprising: receiving, at a server via a first internet connection channel, a request from a remote device to authenticate a payment, said request including an IP address and a payment amount, wherein said internet connection channel is not a channel of said mobile network operator; retrieving, from a data store, one or more natural language code words; sending to said IP address via said first internet connection channel, said one or more code words to said remote device; receiving from said user via a wireless channel of said mobile network operator and a mobile network operator gateway a user message from said remote device, said user message comprising an identifier of said remote device, an MNO identifier of said mobile network operator, and text data entered by said user into said remote device; comparing said text data entered by said user with said one or more code words to authenticate said payment; identifying, responsive to said authentication, said user to said mobile network operator using said MNO identifier and to said identifier of said remote device; and providing said payment amount for said identified user to said mobile network operator.

The first internet connection channel may be a WIFI connection to a WIFI basestation, then via an internet ISP gateway to the internet for example (in other words, not via a mobile operator's cellular network).

The method may further comprise storing history data, responsive to said comprising, for determining a success rate of users in authenticating transactions using a said code word; and selecting said one or more code words from said data store responsive to a success rate of past users in authenticating transactions using the code word determined from said stored history data.

The method may further comprise selecting said a said one or more words from said data store such that for multiple concurrent users a first selected code word for a first user will not auto correct/complete to a match second code word for a second, different, concurrent user with more than a threshold probability.

In other words, the method may select words to ensure that pending response from different users are different, and may not auto correct or complete to a different word in order to prevent any accidental incorrect assignment of responses to an incorrect user.

According to a further aspect of the invention there is provided a payment authentication server for enabling a user of a mobile device to make a payment via a mobile operator billing system of a mobile network operator, the server comprising a processor and stored processor control code for: receiving, at a server, a request from a remote device to authenticate a payment, said request including an IP address and a prepayment account, and wherein said internet connection channel is not a channel of said mobile network operator; retrieving, from a data store, one or more natural language code words; sending to said IP address via said first internet connection channel, said one or more code words to said remote device; receiving, at a server via a first internet connection channel, a request from a remote device to authenticate a payment, said request including an IP address and a payment amount, wherein said internet connection channel is not a channel of said mobile network operator; retrieving, from a data store, one or more natural language code words; sending to said IP address via said first internet connection channel, said one or more code words to said remote device; receiving from said user via a wireless channel of said mobile network operator and a mobile network operator gateway a user message from said remote device, said user message comprising an identifier of said remote device, an MNO identifier of said mobile network operator, and text data entered by said user into said remote device; comparing said text data entered by said user with said one or more code words to authenticate said payment; identifying, responsive to said authentication, said user to said mobile network operator using said MNO identifier and to said identifier of said remote device; and providing said payment amount for said identified user to said mobile network operator.

The invention further provides processor control code to implement the above-described methods, in particular on a data carrier such as a disk, CD- or DVD-ROM, programmed memory such as read-only memory (Firmware), or on a data carrier such as an optical or electrical signal carrier. Code (and/or data) to implement embodiments of the invention may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language). As the skilled person will appreciate such code and/or data may be distributed between a plurality of coupled components in communication with one another.

Features from the above described aspects and embodiments of the invention may be combined in different permutations.

BRIEF DESCRIPTION OF THE DRAWINGS

These and other aspects of the invention will now be described, by way of example only, with reference to the following drawings in which.

DETAILS DESCRIPTION OF THE PREFERRED EMBODIMENTS

An on-line payments and billing platform is described (the Bango™ platform), which optimizes and presents the "on screen" user experience when a person makes a purchase on a networked electronic/mobile internet capable device. Such devices include, but are not limited to, categories such as smart phones, feature phones, tablets, handheld gaming devices, connected TVs, laptop computers and so forth, generally any device that can provide a communications/network connection to allow a user to perform content purchase (herein generally referred to as communications capable devices).

As more internet devices are capable of providing a unique identity to that device, the disclosed payment technology is able to optimize the performance of on-line payments to generate faster checkout times and higher success rates (conversion rates) than has been possible in the past.

In addition to optimizing the mobile internet payment experience, the platform processes the transaction on behalf of merchants/vendors, by automatically selecting the most applicable billing route. Any billing route can be supported, including charge to phone bill, charge to payment card, prepaid credit (such as gift vouchers), payment service provider account (such as PayPal™ or Amazon™) and person-to-person settlement.

Figure 1:
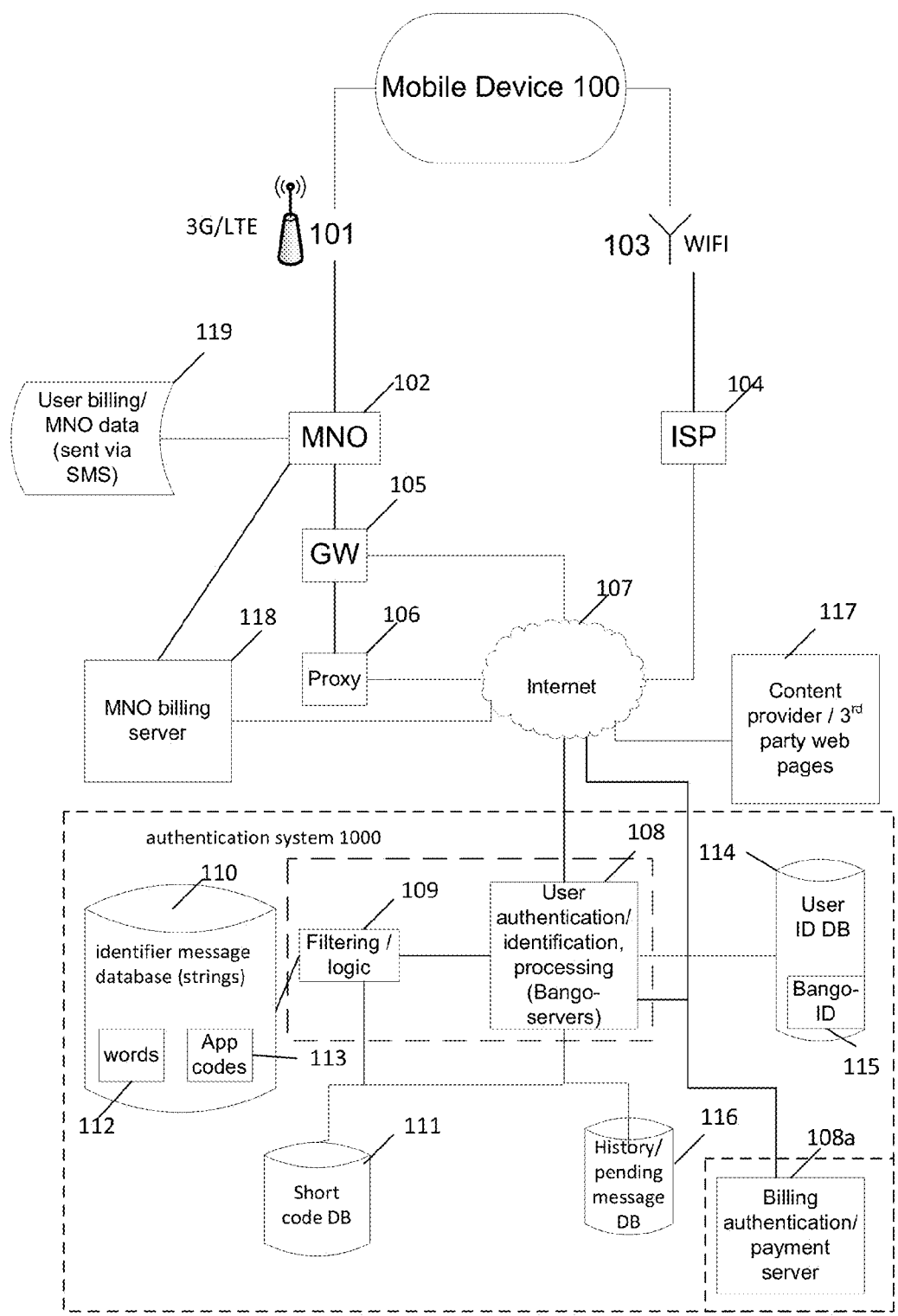
FIG. 1 shows the authentication system and its communications with a communications capable device.

FIG. 1 shows the authentication system 1000 in communication with a mobile communications device 100.

The mobile communications device has a cellular chipset and interface for providing GSM/CDMA/3G/4G mobile/cellular communications via cellular network 101, and also a wireless LAN (WiFi) interface for communication over a wireless local area network 103.

To browse and purchase items via the cellular network 101, communications and data transfer is via a mobile network operator (MNO) 102, which has a gateway 105 to the internet 107. The MNO or device may optionally use a proxy server 106 interfacing between the mobile device and internet web pages (for example, as provided for Blackberry™ devices or some tablets, such as the Amazon Kindle Fire™. Connection can then be made to the content provider 117.

When a user opts to purchase an item of content from the content provider 117, they are redirected to a payment/authentication platform 1000. One option is to pay via their mobile phone provider/bill. By virtue of communicating via the cellular network billable user identity (MNO identity data) information is appended by the cellular network, such as by the gateway 105, meaning that the user's mobile account can be identified from the data stream. The billable user identity is often made up of the user's mobile phone number (MSISDN) and the operator ID (e.g. Vodafone). This means the system then knows which account on which operator to place the charge.

Before processing a mobile payment, the platform establishes this "billable (user) identity" for each individual device user. This is a secure, authenticated identity that enables the platform to map billing credentials for each user to the transaction. In particular, the identity can be used to process billing events to that user's account. The billable identity selects the appropriate billing ID to process a charge, dependent on the billing route selected.

In other words, to bill someone (a billable user identity) the system identifies a) who the user's operator is (e.g. Vodafone™) and b) an identity that the operator will recognise. For automatic user identity using the operator gateway data this is often an anonymous key. When authentication is by the process herein described, via SMS (as above), the mobile phone number MSISDN may be used. Mobile network operators typically accept both as the user identity for the purposes of billing.

In the case of payments charged to the operator phone bill, the payment platform may automatically set an identity, based on information passed by the internet gateway connecting the user to the payment platform when the user is communicating via a cellular/mobile (i.e GSM/CDMA/3G/4G etc) network. When the payment platform obtains this information, it is linked to the anonymous, unique Bango ID (a unique ID assigned to a user within the payment/payment authentication system hosted by the payment system provider). The billing process can then complete.

Additional user identification may also be stored against the unique ID (Bango ID), including:

The Unique Device ID (UDID) or equivalent. This is used as a form of identity for in-app payments. A UDID, for example, is a unique device identifier specific to a device A unique, encrypted cookie is stored on the consumers device for web/internet payments The system may not always get other IDs. However, as well as cookies and UDID/EMEI it may also record third party identities. As an example, for a social network platform, such as Facebook™, this could be an encrypted Facebook identity. This may be used on the Bango™ authentication platform for re-identification.

These additional identifiers allow the billable identity to be retrieved, even if it is unavailable in real-time over the current connection—for example when the customer is connected over a WiFi network which cannot provide a billable identity. Such information may be obtained from the communications device if, for example, as a result of a previous transaction, a cookie (or other identifier) has been stored on the communications device—such a cookie may store a user's unique ID or other form of identifier allowing the authentication platform to identify an appropriate billing ID to charge to. Alternatively, if a UDID has previously been identified and stored, this may be used to identify a user's account/unique ID on the authentication platform 1000.

In the second example, a user opts to browse and purchase items via the WiFi connection 103 on their communications device 100 in FIG. 1. Data transfer is now via an internet service provider (ISP) 104 instead of the mobile network operator (MNO) 102, meaning that no billable user identity can be appended to the data. In this situation, the billing process requires real-time authentication.

Where a billable identity cannot automatically be established, either as part of the current connection or through alternative identifiers (as above), the billable identity to bill against is obtained using the Bango™ User Authentication platform 1000 as set out below.

A server 108 provides a processing system to perform the authentication/identification and processing and is coupled to a user ID database 114 storing, for example unique IDs for each user (for example Bango-IDs 115). As new users are created, for example, as new transactions are processed, this database may then be updated with new unique IDs for each new user, along with other data such as billable identity information, UDIDs and the like following completion of the authentication/identification process.

The authentication server 108 deals with authenticating the user (i.e. they are who they say they are) and provisions for each user to have one or more payment methods authenticated (operator billing, cards etc). An identified/authenticated user with one or more authenticated billing methods is enabled to make a payment using the Bango Payment server 108*a*. In the embodiment shown in FIG. 1 the authentication and payment servers are show as separate servers, which may typically be how such systems are implemented (it will be appreciated however that in some embodiments the systems might be combined).

A user identifier string database 110 stores strings, such as words 112 and application codes 113 (discussed later) to be used as part of the user authentication/identification process.

It will be appreciated however that in variants these may be separated into more than one database—one for words 112, and one for app codes 113. Different databases may be used for different user languages.

A historical data store (pending message data store) 116 stores a history of user identifier strings transmitted as part of the user authentication/identification process. This may store data including, but not limited to, the transmitted user identifier string, content item data to identify a particular transaction in process, a unique transaction ID, a transmit time of a message and priority field data for the message.

A short code database 111 stores short message codes (short SMS codes), which provide contact numbers for users to send message responses (responses) to the authentication system 1000.

Filtering/logic system 109, which in some embodiments may be part of the server 108 as depicted by the dotted line in FIG. 1, determines the strings to be sent to a user in order to provide the authentication.

The platform of FIG. 1 may be used in two variants in order to authenticate and identify a user. The first is for in-application payments (herein referred to as "in-app payments"); the second for web/browser based payments (herein referred to as "web payments").

Figure 2:
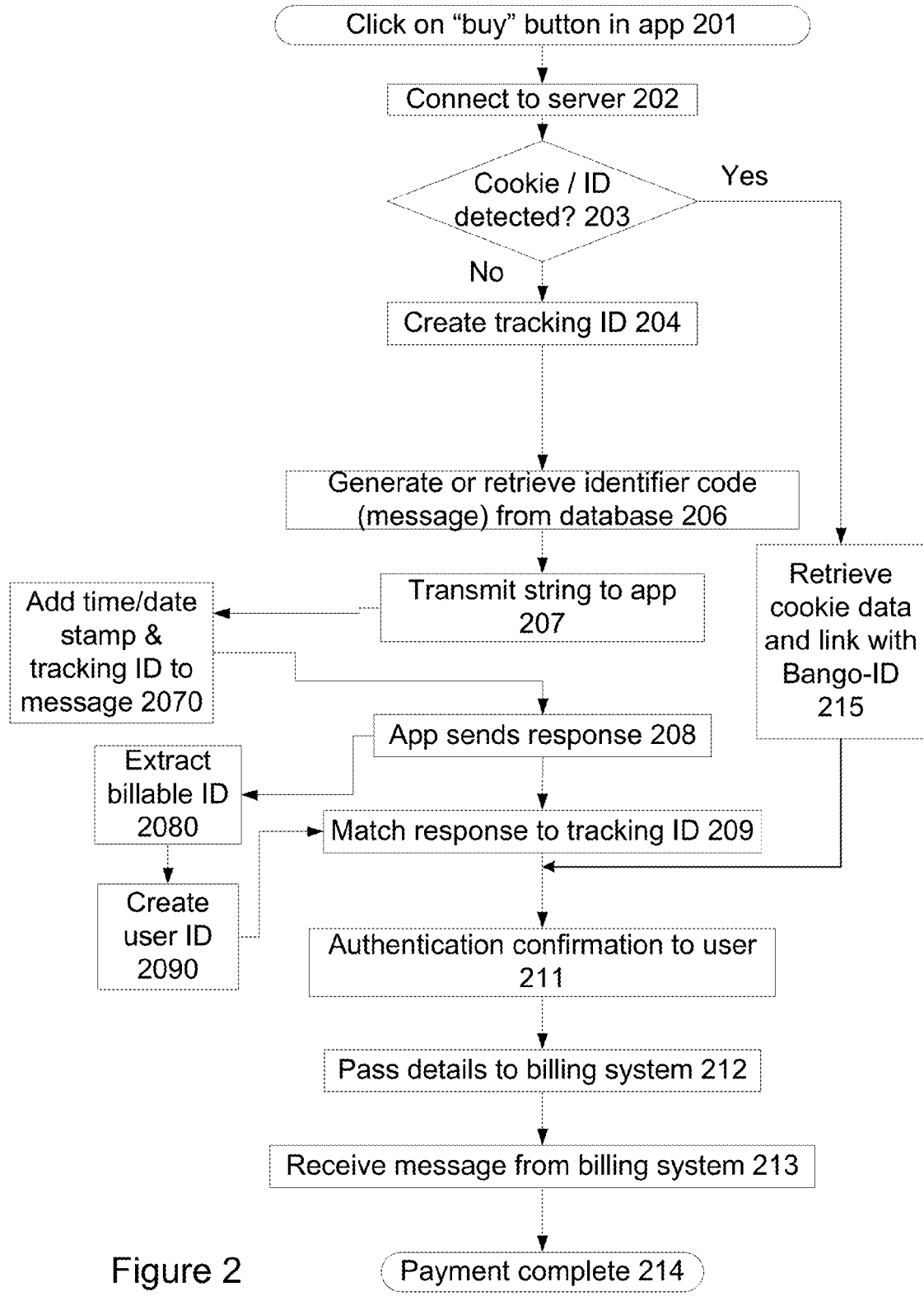
FIG. 2 shows the process of purchasing an item of content and identifying a user via an in-app purchase process.

Referring now to FIG. 2, this shows an example of the process for purchasing via an in-app purchase. In this process, an application running on the communications device provides capabilities for purchasing content. This may be, for example, additional content for a game, magazine or newspaper, or enhancements for the application to enable new features.

At step 201 a user presses the "buy" button in an application and the application connects/is directed to the payment authentication system 1000 at step 202. The authentication system 1000 then checks to see if a cookie is present on the communications device 100 at step 203. If such information is available, this provides identification of the user without needing to transmit the user identifier string to a user and receive an SMS response.

In general, it will be appreciated that any transaction needs to be authenticated, but the process may vary. There are two types of authentication:
1. Authenticating the user—they are who they say they are. This is a Bango User ID or a Tracking ID. It is based on cookies, UDID/EMEI/WiFi MAC/3$^{rd}$ party ID etc. It means we have seen the person before. When the system isn't aware of the user, a temporary id (the tracking ID) may be used.
2. Authenticating the payment method—this may be automatic because their operator's gateway tells us, it may be through SMS or for cards, simply entering the valid details.

A user may have multiple authenticated payment methods stored against their Bango User ID. Once we re-identify/authenticate the user we can use those payment methods to make payments without re-authenticating them every time.

If detected, data may be retrieved from the authentication system and linked with the stored data on the authentication system, such as the user's unique Bango™ User ID (Bango™-ID) at step 215. The Bango ID has the billable identity stored against it (and against the cookie, EMEI, third party account etc)—this means that in subsequent transactions it may not be necessary to re-authentication, providing a one-click payment process (however, sometimes it may be preferable to re-authenticate, randomly, periodically or if transaction characteristics are suggestive of potential fraud risks).

If no cookie is detected at step 204, then the user must be identified/authenticated. A tracking ID (a transaction ID) is created at step 204 which provides a temporary ID for the transaction in process to which information relating to the transaction can be linked and stored. This temporary ID may then by migrated to a Bango User ID (to an existing ID for an existing user, or new ID for a new user).

At step 206, a user identifier string is requested from the apps codes list 113 in the user identifier string database 110. A short code number may also be requested from the short code database 111 if more than one is available.

The user identifier string and short code are sent to the application at step 207. The user identifier string and short code are stored in the pending message database 116 until a response is received.

The application uses the short code to automatically send a mobile originated text message containing a copy of the user identifier string at step 208. This may take place without user intervention, or the user may be notified that a text message needs to be sent incurring charges to the user. However, the user is not required to enter any string, instead this happens automatically—on receipt of the string, the application may automatically invoke an SMS application, or use its own, to automatically respond. Alphanumeric codes may be used as the appcode messages. The complexity of the message sent does not matter as no user retyping is required. Codes may be provided randomly for example, so long as they do not overlap with any response that has not yet been received.

On receipt of the text message the authentication system extracts billable user identity information at step 2080, This data is provided by the SMS gateway. The billable Identity may be a combination of, for example, operator ID (e.g. Vodafone™) and an identity for the user that the operator recognizes/accepts, such as their phone number. This provides the necessary information to connect with the correct operator billing system and place the charge.

At step 2090 the platform may create a user identity (the Bango™ User ID) for use with any future transactions. This billable identity information is stored against the customers unique Bango User ID to identify that customer in future billing requests. The message response can then also be matched against the transmitted user identifier string data at step 209 to associate the billable identity information with the transaction/tracking ID, and thus a particular pending transaction.

At step 211, the user may be notified to confirm that the identification/authentication process has completed, and that purchasing via a mobile account is now possible.

At step 212 the billing system is contacted to verify that the purchase can be accepted (this may subsequently require communicating with a MNO to check the user has no bars on purchasing and/or can pay for content or has sufficient funds available for example). With approval, at step 213 payment is approved and subsequently a notification is sent to the user and content provider confirming payment has been taken. With payment complete at step 214, the content provider may then provide the user access to the content to download.

Figure 3:
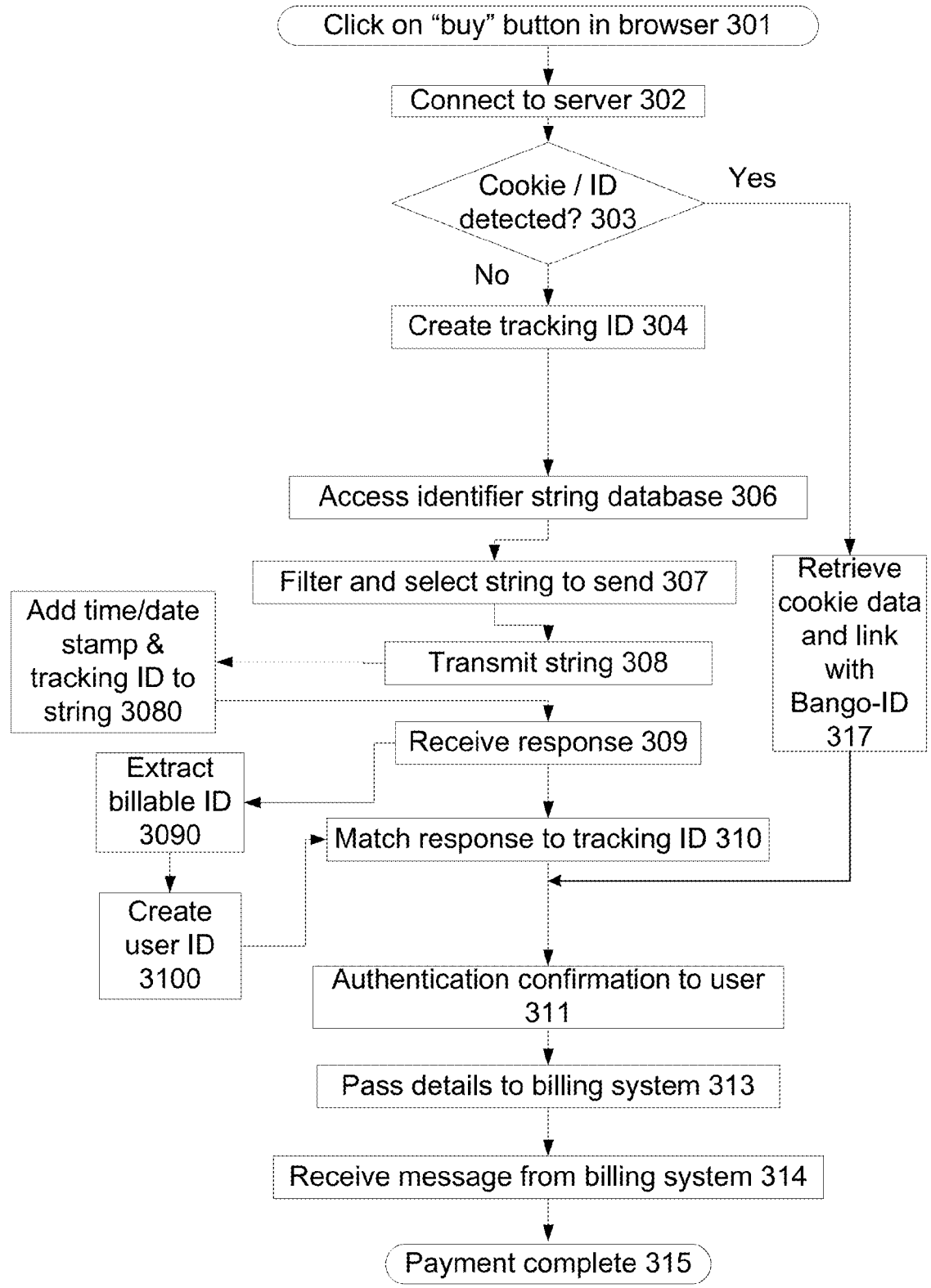
FIG. 3 shows the process of purchasing an item of content and identifying a user via a web browser.

Referring now to FIG. 3, this shows an example process for purchasing via a content providers web page (web payments).

At step 301 a user presses the buy button on a web page and the application connects/is directed to the payment authentication system 1000 at step 302. The authentication system 1000 then checks to see if a cookie/tracking ID is present on the communications device 100 at step 303 providing an immediate identification of the user if they have used the purchasing system before.

If detected, data may be retrieved from the authentication system and linked with the stored data on the authentication system, such as the user's unique Bango-ID at step 215.

In this instance, the payment page pauses if a user identity cannot be obtained in real time or retrieved. With no identification retrievable the user must be identified/authenticated. A tracking ID is created at step 304 which provides a temporary ID for the transaction in process to which information relating to the transaction can be linked and stored.

At step 306, a user identifier string is requested from the words list 112 in the user identifier string database 110. A short code number may also be requested from the short code database 111.

A selection of user identifier strings are filtered and one message selected at step 307 (an SMS short code may also be selected of options are available) and then sent/presented to the application as a web page. The process by which the selection is made is described later with reference to FIG. 4.

The user identifier string and SMS short code are stored in the pending message database 116 along with the transaction ID assigned to the particular transaction until a response is received. A time/date stamp is also added to the information at step 3080.

At the mobile communications device, the browser either constructs the text message itself and asks the user for permission to send it, or automatically inserts the received user identifier string text (which may be a single memorable word) into the text message body and the short code into the designation filed within the local messaging tool, sending the response via the SMS short code number to the authentication platform 1000. If it is not possible to automatically construct and send the text, the short code is auto-inserted and the user is asked to type the memorable word into the message field. Furthermore, if the device prevents the short code being auto-inserted as well, the user may then need to enter both the message and short code.

In variants of this approach, in particular when a user is performing the content purchasing from a device such as an internet enabled TV, PC or tablet (without an inbuilt cellular radio) the user would see the user identifier string on the non-communications capable device (e.g. PC, TV etc). They would send the text message on their cellular communications device (phone) that they wish to make payments on. In future clicking to pay on the non cellular communications capable device (PC, TV etc) would cause the payment transaction to be performed against the phone number and operator of their separate cellular communications capable device (phone).

With manual text entry, providing a string that is memorable and easy to enter is important to minimise any undue burden on the user—hence the preferred use of a single word (or short phrase) to receive and copy into the text message response. The use of a common language word (or words) is an important part of this authentication architecture. The authentication for billing purposes requires the user to be fully aware of the process, so words are chosen to be common, Words must also be easy to type using small keypad devices, particularly if the auto-insert feature is not supported. Words provided for authentication are valid for a limited period of time, after which they expire. With the word(s) entered, the user may then return to their web browser to complete the purchasing process.

The authentication platform 1000 receives the response from the communications device at step 309.

On receipt of the text message the authentication system extracts billable user identity information at step 3090, which includes a mobile identity code and obtains an authenticated billable identity—the customer's mobile phone number and MNO. This data is provided by the SMS gateway.

At step 3100 the platform may create a user identity for permanent storage in the authentication platform for use with any future transactions. This billable identity information is stored against the customers unique Bango User ID for example to identify the customer in future transactions.

Figure 7:
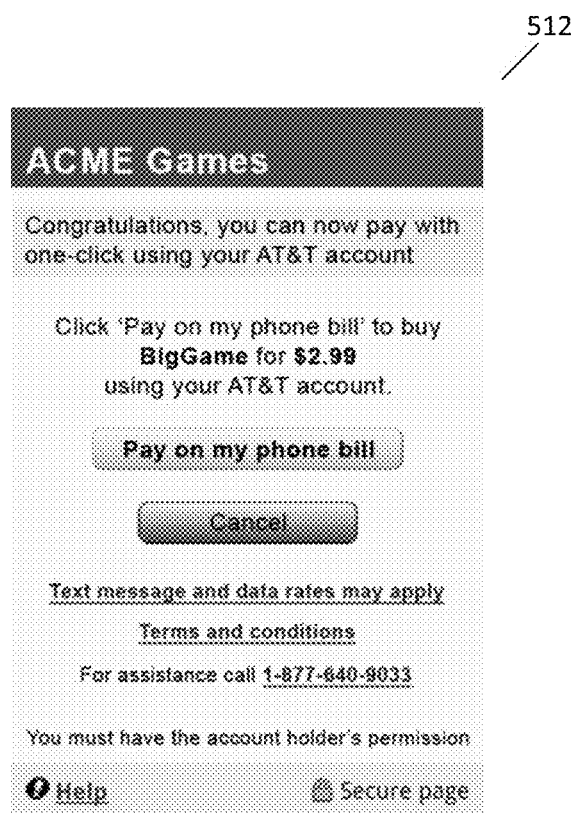
FIG. 7 shows an example of the response screen presented to a user by the authentication system.

At step 311, the user may be then be redirected to a webpage, such as that shown in FIG. 7, providing confirmation that the identification/authentication process has completed, and that purchasing via a mobile account is now possible.

As an additional or alternate method of confirmation, the system may send the user a confirmation SMS message on receipt of the correct user identification string. This means that if user A persuades user B to send their memorable word (therefore accepting payments on their behalf) that user B would get a text to say they have successfully identified themselves for mobile payments—this would then give user B the option to cancel/opt-out.

At step 313 the billing system is contacted to verify that the purchase can be accepted (this may subsequently require communicating with a MNO to check the user has no bars on purchasing and/or can pay for content or has sufficient funds available for example). With approval from the billing system, at step 314 payment is approved and subsequent a notification sent to the user and content provider confirming payment has been taken. With payment complete at step 315, the content provider may then provide the user access to the content.

Figure 4:
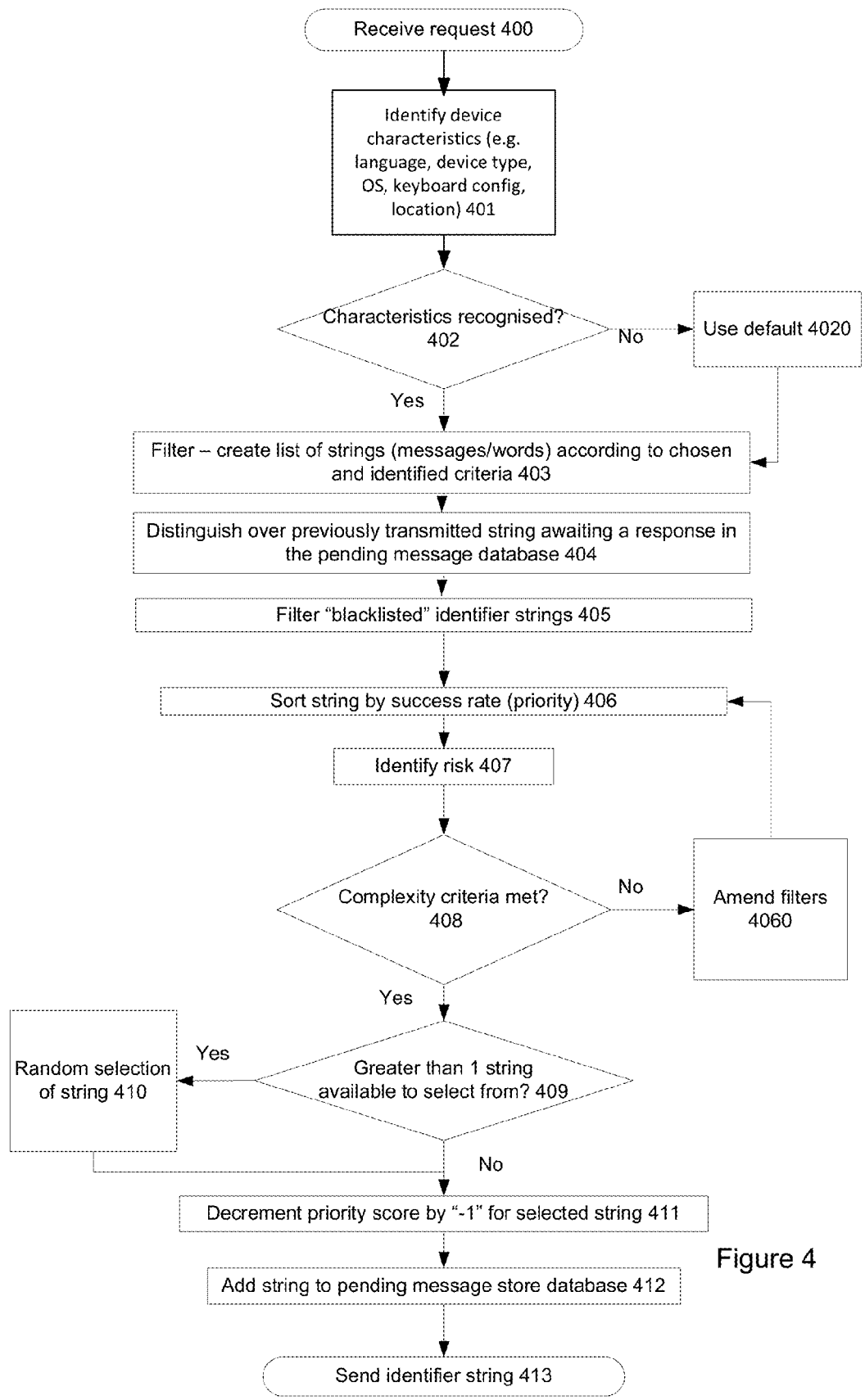
FIG. 4 shows the process of filtering and selecting a message for transmission to a user.

Referring now to FIG. 4, this shows the word selection process used in step 307 of FIG. 3. The selected word forms the user identifier string transmitted to a user's mobile communications device at step 308 in FIG. 3.

In summary, the filtering logic 109 in the authentication system 1000 provides for 'smart selection' of memorable words for transmission. Words may be selected from the local user language, determined by identifying the language setting of the user's device. Localization ensures that appropriate words are provided in each market.

The Bango™ authentication algorithm also supports "autocomplete" words. These are words which the consumer's specific mobile device is able to autocomplete, helping speed up completion of text entry, ensuring that error rates are close to zero. In this case each word selected for use is chosen using different start characters to avoid subsequent users being given similar words that may autocomplete to the same word. Additional word logic is used to ensure minimal word overlap—for example "Ball" and "Bell".

Words provided for authentication in the user identifier string are valid for a limited period of time, after which they expire. Upon expiry, the word is released and can be used again in a new authentication process. This has the advantage of ensuring that common words are always available; they are recycled after each use or each expiry period.

The string generation process is now described in further detail with reference to FIG. 4. In the example mobile SMS authentication flow, the user is asked to type a short memorable word. As they type there is a strong chance that the word will be offered for auto-completion by the keyboard on their device. They can continue to type or click to autocomplete.

At step 400 a request is received to obtain a new word for use as a user identifier string for transmission to a user.

At step 401, characteristics of the user's mobile communications device are identified.

This may be provided, for example, by identifying the Browser User Agent (BUA). This is a string of identifying details provided by the device to the web server for the purposes of page formatting. It includes device manufacturer, model, version, browser, language etc. Other details may also be provided, including a connection IP address. This may be the operator gateway server or the WiFi provider/ISP for example and may provide information relating to location and country. The Bango™ SMS authentication system uses short, memorable words that may be automatically selected based on such characteristics. These include, by way of example:

The users language as defined by the users app or web browser—the word will be shown in their chosen language where possible to make them easy to remember The users device type, make and model and the physical or virtual keyboard used. This may include considering the autocomplete dictionary in use to help minimize key presses to type the word. Autocomplete words are considered to both make a word easier to type and to also avoid incorrect auto-completion where two different words may autocomplete to the same word, or can easily be miss typed, for example "Ball" and "Bell". The platform may select the next alphabetic letter for the first two characters of each subsequent word, so they are disparate enough to avoid auto-completion to the same word. For example:
BALL
CRATE
DOOR The user's location (country, state/county, city, ZIP) to account for memorable regional words. Such information may be derivable from the IP address of the WiFi connection that the communications device is connected to. In some devices however, it may be possible to obtain the data from a GPS signal if such information is available.

Available facts about the user and past history of interactions to leverage successful sets of word and avoid sets of words known to fail. The system may store previous authentication attempts and payments made by users in order to provide such information.

User demographics to align words to gender, age or income.

By way of example, the following characteristics may be identified:

the user has an Android phone with the standard virtual keyboard, and the language is set to English.

In this example, the operating system allows the SMS short code number to be automatically entered, meaning that the user only needs to memorise and enter the word present in the user identifier string.

At step 402, if no characteristics are recognisable (it may be a new device, with a new operating system for example), then a default set of characteristics may be selected at step 4020.

At step 403, the database of words and/or phrases 112 in the identifier message database is accessed and filtered to create a subset of optimised strings ("code words"), typically natural language words, for the identified characteristics.

Linguistic selection of memorable word combinations is used to predict more memorable words and word combinations. This includes the provision of phrases having, for example:

Same start letters, for example "brown banjo" is more memorable than "green banjo"

Common two word phrases, for example "deep sleep"

Expected word combinations, for example "yellow banana" or "green apple" is more memorable than "pink banana"

Rhyming word combinations, for example "camp scamp"

To extend the amount of memorable words available, linguistic techniques above may be applied to strings of characters that are not real words in the users own language. These single fake words, for example "zomp", or fake word combos like "gomp zomp" remain memorable and suitable for use.

Note that these words are most suited to use as fall-backs since they would not autocomplete correctly on the keyboard.

Add memorable dates (e.g, for UK users, 1984, 2001, 1066) and number combinations may also be used as fall-back options.

As part of this process in step 404, the choice of strings is further filtered against those still pending a response in the history/pending message database 116 to ensure the content of the string is distinguished over other strings awaiting a response.

Smart word capitalization may also be used to select words for entry by a user in the correct capitalization that corresponds to the default capitalization state of the device keyboard. This avoids the user having to think about getting capitals correct as the keyboard is already in the correct state and removes the need to press the caps key to change the default capitalization, therefore saving keystrokes.

For example most smartphones auto-capitalize the first character of the first word while the second word starts with a lower case character. This means that the authentication system will show "Ball" or "Brown fox". In many embodiments the capitalization of the text received will be ignored. However, the fact that the message presented to the user is in the anticipated autocomplete form means that no undue burden is placed on the user who may anticipate having to match the capitalisation.

To handle common mobile typing errors, such as capitals, quotes and spaces for example, the authentication platform may ignore and compensate for such common typing errors. This may include, for example:

Capitalization—the platform may be case insensitive when comparing the response to the sent message.

Quotes—quotes and any other nominated special characters may be removed.

Spaces—the sequence of characters or numbers may be considered, and not the position of spaces. Spaces may be removed.

Given the above, combinations of words used in strings are chosen to avoid those that will result in the same sequence of characters with a space as the only differentiator, for example "now here" and "no where". The filtering process prevents "now here" being used as a message if "no where" is in the list of pending messages awaiting a response. This eliminates any overlap.

However, it will be appreciated that any one of the error handling techniques is entirely optional and it may be preferable in some circumstances to require precise spacing or typing when the potential for fraud is deemed to be high.

The authentication platform uses lists of words that are designed to be easy for each user to remember and type. Words may be recorded with a "success rating" that indicates the ease by which a user finds a word to remember, type and send the word.

At step 405, blacklisted words or phrases may be filtered to ensure that no offensive words or phrases are provided. This filtering may be also be dependent on location or language.

As part of the selection process, strings may be sorted by success rate at step 406. Words presented to multiple users that prove very successful are given a higher success rating and may be used more frequently, while words which repeatedly fail to be texted back correctly for authentication are given a lower success rating. Once a word has been selected, in step 411, a priority score associated with the selected string to be transmitted is decremented, for example, subtracting "1". Not shown in FIG. 4, when a user response is received and the message response data matched to a transmitted (displayed) user identifier string in the pending message database 116, the priority field may be incremented by "+2" to record that a successful response for that particular message was received. Therefore, the overall effect is to increase the priority score by "+1". If no match is received, then the previously transmitted message retains its previous priority score with "1" subtracted. Words with the lowest success rating may be discarded from the authentication platform completely. The number of failures that precede a word being discarded is configurable.

The frequency by which individual words are used may also be dynamically adjusted based on the rating of the word. For example, during a number of months, five users are asked to text the word "Yacht" to authenticate. In each case the user either fails to send a text or sends a text containing incorrect spellings of the word. In each instance "Yacht" is given a lower success rating in the system and may eventually be removed from the list.

At step 407, a risk analysis may be performed in order to determine the complexity of the memorable word to use in the user identifier string. At step 408, if the selection of words fails the complexity criteria, the filters may be adjusted to regenerate a list of words for use.

The authentication platform 1000 may also apply a "risk rating" to each word based on the uniqueness, length and strength of the word. Words that are short and similar to other words will be given a high risk rating, for example Bat, Cat, Rat or Sat. Longer words with less frequently used characters will be given a low risk rating, for example Yacht, Zoo or Qiang.

By default the authentication platform uses words with a high success rating, those that are most memorable, short and easy to type. These words tend to also have a higher risk rating. When the authentication platform detects increased levels of threat or potential for fraud it may start to select words or word pairs with a lower risk rating to increase the challenge. Selecting lower risk words increases the complexity of words, along with the length and combination of letters used, thus raising the level of security and lowering the potential threat. Naturally these words are likely to possess a lower success rating. The platform may then automatically adjust the success and risk elements to balance ease of use and success against risk and potential fraud.

Detecting increased levels of threat/potential for fraud may be, for example, specific to countries where fraud is known to be higher, or where lots of users on the same WiFi/ISP network are requesting words (e.g. strange usage patterns from the same network or one device model making lots more authentication requests than other models combined.)

For example, if fraud is suspected when using short words (for example "blog") or the user is in a high risk location (for example some specific countries for example ID address corresponds to a 'high risk' area) then the authentication platform will switch to longer, lower rated words (for example "banana") or pairs of words (for example "green banana"). Another example of suspected fraud is when messages are received from the same user in a short period of time.

If available, the authentication platform may also record the user's carrier, device, location and connection before they are asked to send the authentication text message. The authentication platform then looks at the carrier specific information supplied on receipt of the return text message from the user. Where this received information does not match the information recorded at the start of the process a potential fraud attempt is flagged.

On WiFi the carrier may not be known so the country, of the current network connection or handset location, is checked against the carrier the text message is received from. This may not immediately flag a fraud attempt because the user may be roaming, however multiple instances may raise an issue in the platform, especially for high risk countries.

It may be acceptable for a user to text the correct word multiple times within the allocated time period as it will be detected from the same carrier and phone number. However, multiple text messages received from multiple sources, even with the correct word, automatically invalidates authentication for all parties involved. For example, user A is an AT&T™ iPhone™ user and although they are connected over their carrier network the platform is not provided billable identity data automatically by AT&T™. User A is asked to text "rabbit" to authenticate. In the meantime, user B, on Sprint™, randomly texts "rabbit" to the authentication platform. The text received is from Sprint while the word was known to be presented to an AT&T™ subscriber; here the authentication is invalidated and flagged.

If user B was also an AT&T user and the authentication platform receives "rabbit" from both user A and user B (two different numbers) then again the authentication is invalidated and flagged.

As another example of fraud avoidance, the authentication platform may send a "confirmation/success" message back to the user that successfully sends in a memorable word to the correct short code. This ensures that the user was expecting to authenticate for payments and eliminates and possibility of incorrect phone accounts being used to make payments. For example, this means that if user A persuades user B to send their memorable word (therefore accepting payments on their behalf) that user B would get a text to say they have successfully identified themselves for mobile payments—this would then give user B the option to cancel/opt-out.

The success text confirms that payment to their operator billing account is now confirmed and offers a link to learn more. Clicking on the link provides an additional method of tying up encrypted cookies, HTML5 local storage and other methods.

If more than one word is available that meets all the necessary criteria (step 409) a word may be selected randomly at step 410 from those in the filtered list. Then, as previously discussed, the priority score is decremented at step 411 and the selected message added to the pending message list/database 412.

The selected word is then issued as a user identifier string at step 413.

Once a string has been issued the user has a defined time in which they can respond to the payment authentication system 1000 by sending a copy of the received word to the SMS short code number received with the message. After this time the word expires and the user must obtain a new word to authenticate by text—the transaction may need to be reinitiated, or if the device is still on the page showing the word, it may refresh to show a new word. The word expiry time is configurable and may vary based on country and the associated risk factor. An expired word (string) is placed on the end of the word list for re-use. A used word, in this example embodiment, is not re-used within a defined exclusion period. For example, a user is asked to text the word "ball" to authenticate. They leave it too long and are given a new word "banana" to text instead. Both "ball" and "banana" will not be re-used for a defined period.

Figure 5:
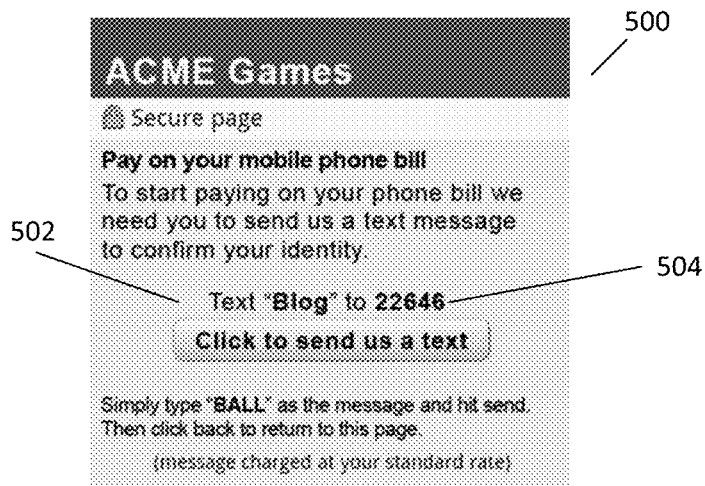
FIG. 5 shows an example screenshot of the message presented to a user by the payment authentication platform.
Figure 6:
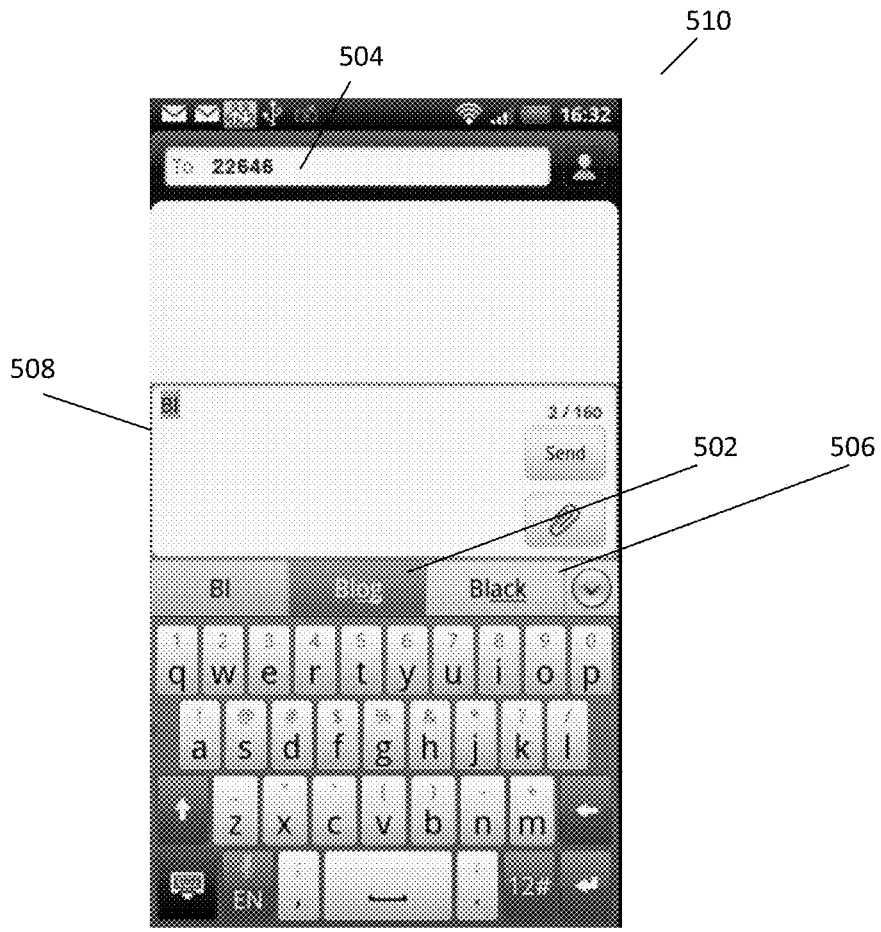
FIG. 6 shows an example of SMS entry by user.

FIGS. 5, 6 and 7 show an example of the system in use. In FIG. 5, a user is purchasing an item of content from a content provider's website and has been redirected to the payment servers/system in order to pay for the item of content. The user has opted to pay for the content via their mobile phone account. However, as the user is performing the transaction via a WiFi network, no billable user information pertaining to the user is available meaning there is no known billable identity to charge to a mobile phone account against.

The user is presented with screen 500, preferably as a secure page, with a word "Blog" 502 to text to an SMS short code "22646" 504. Pressing the "click to send button", on this particular device opens up the SMS application (although on others, the user may need to open up the SMS application manually).

In FIG. 6, in the SMS application 510, the SMS short code number is entered in the "to" field 504, and the memorable word then entered in the message box 508. As the user enters the first two characters "B" and "I", the autocomplete algorithm on the mobile device presents the user with several autocomplete options, the first being "Blog" 502 as required to be sent. The fact that the payment server was aware of the device characteristics means that the word originally presented in FIG. 5 is likely to be the first suggested by the autocomplete algorithm after a few (2, or 3 for example) of the first letters are entered by a user. Another option presented to the user is "Black" 506 which is not the desired word. The user can select the word "Blog" from the autocomplete word list to complete text entry without typing any further letters. The payment system, aware of the particular autocomplete algorithm/device characteristics, may preferably be able to filter words when generating the user identifier string such that if "Blog" has been transmitted and is awaiting a response, then "Black" will not be selected as another word/message to send out to a user, to avoid any risk of accidental mis-selection or incorrect autocompletion. Only when a response to "Blog" has been received, will the filtering permit "Black" to be used.

On sending of the text message, the user then returns to the web-browser and in the purchasing process will subsequently see a confirmation page 512 as shown in FIG. 7 once the response has been received and processed by the authentication server. The user can then finish the purchasing process and pay for the content via their mobile phone account.

The authentication platform (Bango™ platform) may store a cookie on the communications device incorporating the user's unique Bango™-ID assigned by the authentication platform. In subsequent transactions, this ID can be read, meaning that the authentication process no longer requires the message process. However, if such cookie information is wiped by a user, or security provisions mandate re-authentication, if for example, the transaction is coming from a different geographical location (based on IP address for example), the authentication process may be performed again.

In summary, the process of purchasing content may comprise three steps:
1. Identifying and authenticating the user—confirm that they are who they say they and provide capabilities to recognise the user each time they visit (use, for example cookies, UDID/EMEI/WiFi MAC or third party ID (Facebook ID etc).
2. Authenticate the user's payment method—each user may have one or more payment methods authenticated. This could be simply entering card details, automatically getting operator ID and phone number or sending a memorable word by SMS as herein described. In general, if a user with one or more authenticated billing methods they will already have a full Bango User ID. If a user has no payment methods presently authenticated then a tracking user ID (temporary ID) may be used during the process.
3. Processing the payment—once we securely identify/authenticate the user we can process the payment using one of their authenticated payment methods, without re-authenticating it each time.

No doubt many other effective alternatives will occur to the skilled person. It will be understood that the invention is not limited to the described embodiments and encompasses modifications apparent to those skilled in the art lying within the spirit and scope of the claims appended hereto.

Through out the description and claims of this specification, the words "comprise" and "contain" and variations of the words, for example "comprising" and "comprise", means "including but not limited to, and is not intended to (and does not) exclude other moieties, additives, components, integers or steps.

Throughout the description and claims, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example, of the invention are to be understood to be applicable to any other aspect, embodiment or example described herein unless incompatible therewith.

What is claimed:

1. A method of enabling a user of a communications capable device to make a payment via a mobile operator billing system, the method comprising:
   determining a user identifier string for sending to a communications capable device; said determining comprising:
      selecting a user identifier string from a message data store according to a probability of success of entry by a user;
   linking said user identifier string to content item data, said content item data identifying an item of content pertaining to said payment;
   sending said user identifier string to said communications capable device;
   receiving, via a mobile network, a short message service (SMS) based user response, said user response comprising a message response and billable user identity, wherein said billable user identity is appended to said user response by said mobile network;
   comparing said message response with a said user identifier string to determine if said message response matches said user identifier string;
   responsive to said message response matching said user identifier string, identifying content item data associated with said user identifier string and associating said billable user identity received from said mobile network with said content item data; and communicating said billable user identity to a billing system to approve said request for said item of content.

2. A method as claimed in claim 1, wherein said user identifier string is stored in a pending message data store, said pending message store configured to store a record of user identifier strings transmitted by an authentication server and said content item data linked to said user identifier strings, and
   wherein said comparing said message response with said user identifier string to determine if said message response matches said user identifier string comprises comparing said message response with said history of user identifier strings in said pending message store.

3. A method as claimed in claim 1, wherein said determining a user identifier string further comprises identifying a characteristic of said communications capable device, and
   wherein said probability of success of entry by a user is dependent on said characteristic of said communications capable device.

4. A method as claimed in claim 3, wherein said characteristic of said communications capable device comprises an operating language of said communications capable device.

5. A method as claimed in claim 3, wherein said characteristic of said communications capable device comprises operating system data for said communications capable device.

6. A method as claimed in claim 3, wherein said characteristic of said communications capable device comprises a keyboard arrangement of said communications capable device.

7. A method as claimed in claim 3, wherein said characteristic of said communications capable device comprises an autocomplete dictionary used by said communications capable device.

8. A method as claimed in claim 3, wherein said characteristic of said communications capable device comprises a location of said communications capable device.

9. A method as claimed in claim 3, wherein said characteristic of said communications capable device comprises device type data.

10. A method as claimed in claim 1, wherein said selecting a user identifier string further comprises retrieving a plurality of user identifier strings from said message data store and filtering said plurality of strings to select said user identifier string from one of said plurality of filtered strings according to said probability of success of entry by a user.

11. A method as claimed in claim 10, wherein said filtering said plurality of strings to select a user identifier string further comprises filtering user identifier strings to distinguish said selected user identifier string from said record of user identifier strings in said pending message store.

12. A method as claimed in claim 11, wherein said distinguishing comprises identifying user identifier strings that autocomplete to a user identifier string different to said record of user identifier strings in said pending message store.

13. A method as claimed in claim 1, wherein said message data store further stores a message string priority associated with each of said plurality of strings, said message string priority defining a history of success of entry of said associated string by a user, and
wherein said selecting a user identifier string is further dependent on said message string priority associated with each of said plurality of strings.

14. A method as claimed in claim 13, wherein responsive to said message response matching said user identifier string said message string priority is increased.

15. A method as claimed in claim 13, wherein responsive to transmitting said user identifier string to said communications capable device said message string priority is reduced.

16. A method as claimed in claim 1, wherein said comparing said message response with a said user identifier string to determine if said message response matches said user identifier string further comprises determining if said message response is received within a predetermined duration from sending said user identifier string to said communications capable device.

17. A method as claimed in claim 1, wherein said message data store comprises a dictionary of words, and said user identifier strings comprise one or more words selected from said dictionary.

18. A method as claimed in claim 1, wherein user identifier string is sent to said communications capable device for rendering as a web page.

19. A method as claimed in claim 1, further comprising selecting a contact number from a list of contact numbers and sending said selected contact number with said user identifier string to said communications capable device;
wherein said user response further comprises a received contact number used by a user of said communications capable device to send said user response; and
wherein said comparing further comprises comparing said selected contact number with said received contact number to determine if said selected contact number matches said received contact number.

20. A method as claimed in claim 1, wherein said sending said user identifier string to said communications capable device comprises sending said user identifier string to said communications capable device via a wireless local area network.

21. A method as claimed in claim 1, wherein said receiving, via a mobile network, a short message service (SMS) based user response further comprises receiving gateway data comprising information pertaining an SMS gateway used to communicate said user response.

22. A method as claimed in claim 1, wherein said content item data comprises transaction identification data.

23. A method as claimed in claim 1, wherein said user response is received from a different said communications capable device.

24. A non-transitory carrier carrying computer program code configured to, when running, implement the method of claim 1.

25. An authentication server for enabling a user of a communications capable device to make a payment via a mobile operator billing system, the authentication server configured to implement the method of claim 1.

26. An authentication server for enabling a user of a communications capable device to make a payment via a mobile operator billing system, the authentication server comprising a processor and memory storing:
code to determine a user identifier string for sending to a communications capable device, said code to determine comprising
code to select a user identifier string according to a probability of success of entry by a user;
code to link said user identifier string to content item data, said content item data identifying an item of content pertaining to said payment;
code to send said user identifier string to said communications capable device;
code to receive, via a mobile network, a short message service (SMS) based user response, said user response comprising a message response and billable user identity, wherein said billable user identity is appended to said user response by said mobile network;
code to compare said message response with a said user identifier string to determine if said message response matches said user identifier string;
code to responsive to a match to identify content item data associated with said user identifier string and associate said billable user identity received from said mobile network with said content item data; and
code to communicate said billable user identity to a billing system to approve said request for said item of content.

27. An authentication server as claimed in claim 26, wherein said code to select a user identifier string further comprises code to retrieve a plurality of user identifier strings from said message data store and code to filter said plurality of strings to select said user identifier string from one of said plurality of filtered strings according to said probability of success of entry by a user.

28. An authentication server as claimed in claim 26, wherein code to determine a user identifier string further comprises code to identify a characteristic of said communications capable device communicating with an authentication server, and
wherein said probability of success of entry by a user is dependent on said characteristic of said communications capable device.

29. A method of identifying a user of a communications capable device to an authentication server for paying for an item of content from a content provider using a mobile operator billing system:
receiving, at a authentication server, content item data pertaining to a requested item of content from a content supplier;
determining a user identifier string for sending to a communications capable device; said determining comprising:
selecting a user identifier string from a message data store according to a probability of success of entry by a user;
linking said user identifier string to said content item data;

sending said user identifier string to said communications capable device;

responding to said user identifier string, wherein said responding comprises sending, via a mobile network, a short message service (SMS) based user response to said authentication server, said user response comprising a message response and billable user identity, wherein said billable user identity is appended to said user response by said mobile network;

receiving, via said mobile network, said SMS based user response at said authentication server;

comparing said message response with a said user identifier string to determine if said message response matches said user identifier string;

responsive to said message response matching said user identifier string, identifying content item data associated with said user identifier string and associating said billable user identity received from said mobile network with said content item data;

communicating said billable user identity to a billing system to approve said request for said item of content.

30. A method as claimed in claim 29, wherein said determining a user identifier string further comprises identifying a characteristic of said communications capable device, and
wherein said probability of success of entry by a user is dependent on said characteristic of said communications capable device.

31. A communications capable device configured to implement the method of claim 29.

32. A non-transitory carrier carrying computer program code configured to, when running, implement the method of claim 29.

33. A method of enabling a user of a mobile device to make a payment via a mobile operator billing system, the method comprising:
determining a user identifier string for sending to a communications capable device;
linking said user identifier string to content item data, said content item data identifying an item of content pertaining to said payment;
sending said user identifier string to said communications capable device;
receiving, via a mobile network, a short message service (SMS) based user response, said user response comprising a message response and billable user identity, wherein said billable user identity is appended to said user response by said mobile network;
comparing said message response with a said user identifier string to determine if said message response matches said user identifier string;
responsive to said message response matching said user identifier string, identifying content item data associated with said user identifier string and associating said billable user identity received from said mobile network with said content item data; and
communicating said billable user identity to a billing system to approve said request for said item of content.

34. A method as claimed in claim 33, wherein said determining a user identifier string comprises:
retrieving a text string from a message data store.

35. A method as claimed in claim 33, wherein said determining a user identifier string comprises selecting a user identifier string from a message data store according to a probability of success of entry by a user.

36. A method as claimed in claim 35, wherein said determining a user identifier string further comprises identifying a characteristic of said communications capable device, and
wherein said probability of success of entry by a user is dependent on said characteristic of said communications capable device.

37. An authentication server for enabling a user of a mobile communications capable device to pay for an item of content via a mobile operator billing system, the authentication server configured to implement the method of claim 33.

38. A non-transitory carrier carrying computer program code configured to, when running, implement the method of claims 33.

* * * * *